United States Patent [19]

Fujiwara et al.

[11] 4,336,341
[45] Jun. 22, 1982

[54] PRODUCTION OF POLYISOCYANURATE FOAM

[75] Inventors: Tsuyoshi Fujiwara, Nagaokakyo; Osamu Sugimoto, Kyoto; Chuzo Isoda, Uji, all of Japan

[73] Assignee: Dai-Ichi Kogyo Seiyaku Co., Ltd., Kyoto, Japan

[21] Appl. No.: 211,275

[22] Filed: Nov. 26, 1980

[30] Foreign Application Priority Data

Dec. 4, 1979 [JP] Japan ................................ 54/157813

[51] Int. Cl.$^3$ ............................................. C08G 18/14
[52] U.S. Cl. .................................... 521/109; 521/116; 521/172
[58] Field of Search ........................ 521/109, 116, 172

[56] References Cited

U.S. PATENT DOCUMENTS 3,455,886 7/1969 Versnel ................................ 521/172
4,128,532 12/1978 Elmers et al. ........................ 521/172

Primary Examiner—Maurice J. Welsh
Attorney, Agent, or Firm—Haight & Associates

[57] ABSTRACT

Polyisocyanurate foam is produced by reacting a polyisocyanate component with an anhydrous reaction product between a dibasic acid anhydride and a partially alcoholated polyether-polyol with an alkali metal hydroxide and/or alkaline earth metal hydroxide. The reaction product acts as a catalyst for trimerizing the polyisocyanate and also as a polyether-polyol component.

10 Claims, No Drawings

PRODUCTION OF POLYISOCYANURATE FOAM

This invention relates to a method for producing rigid polyisocyanurate foam. More particularly, it relates to such a method which employs a novel polyether-polyol component having a catalytic activity on the trimerization reaction of polyisocyanate compounds.

It has been known that selection of suitable polyol component and trimerization catalyst is an important factor which controls the productivity and properties of polyisocyanurate foam. Polyisocyanurate foam is conventionally produced by reacting a polyisocyanate component with a polyol component in the presence of a trimerization catalyst and a foaming agent. Various trimerization catalyst are also known. Among them metal salts of a carboxylic acid are preferentially used from economical and technical viewpoints. Since the catalyst is incorporated into the polyol component containing the foaming agent, it is desirable that the catalyst is freely soluble or compatible with these components. However, said carboxylic acid salts have limited solubilities in the polyol component and are hardly soluble in the foaming agent such as trichlorofluoromethane. Attempts have been made to solubilize the carboxylic acid catalyst in the polyol component such as by reacting potassium hydroxide with a long chain fatty acid in a mixture of polymeric polyol and a glycol under vacuum, or otherwise increasing the solubility of the catalyst in the polyol component. Unfortunately these methods still have certain disadvantages in that the solubility of the catalyst is still limited to a certain level and not every type of polyol may be employed.

According to the present invention, a novel method for producing polyisocyanurate foam is provided comprising reacting a polyisocyanate component with a polyether-polyol component in the presence of a foaming agent and a trimerization catalyst for the polyisocyanate. The improvement resides in the use of a new polyether-polyol component which simultaneously acts as the trimerization catalyst. The new polyether-polyol component is an anhydrous reaction product between a small amount of a dibasic carboxylic acid anhydride and a partially alcoholated polyether-polyol with an alkali metal hydroxide and/or alkaline earth metal hydroxide.

Since substantially all metallic atoms are chemically bound with the polyol component, a single component may exhibit two different functions for supplying active hydrogen atoms on the one hand and also catalyzing the trimerization reaction on the other hand, resulting in improved properties of the finished polyisocyanurate foam.

The starting partial alcoholate of polyether-polyol may be prepared by heating an initiator having at least two active hydrogen atoms in the molecule with an alkali metal hydroxide or an alkaline earth metal hydroxide under vacuum, and then reacting said initiator with an alkylene oxide. The resulting crude polyether-polyols may be used as such for further reaction with a dibasic carboxylic acid anhydride. Alternatively, the crude polyether-polyols or purified polyether-polyols prepared from such crude product or commercially available polyether-polyols may be reacted with the metal hydroxide by heating under vacuum. By these reactions a part of terminal hydroxyl groups present in polyether-polyol may be converted into an alcoholate form with said metal atoms.

Examples of initiators which may be used include low molecular weight polyols such as ethylene glycol, propylene glycol, trimethylolpropane and sucrose, alkanolamines such as mono-, di- and triethanolamine, aliphatic polyamines such as ethylenediamine, diethylenetriamine, triethylenetetramine, aromatic polyamines such as tolylenediamine, 4,4'-diamino-diphenylmethane, and phenylenediamine, and aromatic polyols such as bisphenol A and novolak resins.

Examples of alkylene oxide which may be employed include ethylene oxide, propylene oxide, butylene oxide and the like. Two or more alkylene oxides may be addition-reacted with the initiator as random or block copolymers.

The polyether-polyols initially have a hydroxyl number of 25–1000, preferably of 100–600.

Examples of alkali metal hydroxides and alkaline earth metal hydroxides include sodium hydroxide, potassium hydroxide, calcium hydroxide and magnesium hydroxide. Potassium hydroxide is preferable. The amount of metal atoms chemically bound to polyether-polyols ranges from 0.05 to 10 parts, preferably from 0.1 to 5 parts by weight as metal per 100 parts of the metallized polyether-polyol. It is important that the metal hydroxide added is converted to the alcoholate form as much as possible so as to decrease the amount of remaining metal hydroxide to as little as possible. This may be accomplished by employing higher reaction temperature, vigorous stirring, higher vacuum or prolonged reaction time. Use of polyether-polyols having higher hydroxyl numbers or those having higher content of terminal primary alcohol groups is also effective. The content of terminal primary alcohol groups may be increased by increasing the amount of ethylene oxide to be added to the terminals of the polyether-polyol molecules.

The resultant partially alcoholated polyether-polyols are reacted with a dibasic carboxylic acid anhydride under anhydrous conditions. Examples of the acid anhydrides which may be used for this purpose include succinic anhydride, glutaric anhydride, fumaric anhydride, maleic anhydride, phthalic anhydride, cyclohexanedicarboxylic acid anhydride and the like. Mixtures of these acid anhydrides may also be used. The amount of the acid anhydride ranges from 0.5 to 1.5 equivalents, preferably from 0.8 to 1.2 equivalents per equivalent of the metal atoms. The reaction may be carried out at a temperature of 30°–150° C., preferably 60°–120° C. for 1–3 hours. The use of mono-, tri- or tetra carboxylic acids such as acetic anhydride, trimellitic anhydride, pyromellitic anhydride and the like has been found to be unsatisfactory for the purposes of the present invention.

The resulting reaction products may be reacted with a polyisocyanate compound in accordance with the present invention for producing rigid polyisocyanurate foamed products. The reaction products may act as a polyol component and also as a trimerization catalyst simultaneously. The amount of polyisocyanate compound relative to the polyether-polyol component is such that the equivalent ratio of isocyanate groups to active hydrogen atoms is generally greater than 2. However, ratios of less than 2 may also be employed if higher resistance to heat and flame is not required for the finished foamed products. For example, the isocyanate component may be reacted with the reaction product of metallized polyether-polyol with a dibasic acid anhydride at an equivalent ratio of NCO to active hydrogen of 0.8–1.2.

Any polyisocyanate compound which is conventionally used for the production of polyisocyanurate foamed products may be used. Typical examples thereof are crude 4,4'-diphenylmethanediisocyanate(crude MDI), polymethylenepolyphenylisocyanate(PAPI), crude tolylenediisocyanate(crude TDI), 2,4-tolylenediisocyanate, 2,6-tolylenediisocyanate, naphthalenediisocyanate, xylylenediisocyanate, hexamethylenediisocyanate, isophoronediisocyanate, and prepolymers produced from these polyisocyanates and suitable polyols.

Any conventional foaming agent may be used. Examples thereof include trichlorofluoromethane (F-11), dichlorodifluoromethane (F-12), methylenechloride, water, nitroethane, formamide, urea, boric acid, borax and the like.

Preferably conventional surface active agents may be added to the foaming composition of the present invention. Examples thereof are siloxane-oxyalkylene copolymers (silicone oil), organopolysiloxanes, oxyethylated alkylphenols, oxyethylated higher fatty alcohols, ethylene oxide-propylene-oxide block copolymers and the like.

If desired, other conventional additives such as fire retardants, fillers, colorants and the like may be added to the foaming composition of the present invention. Furthermore, conventional active hydrogen compounds and trimerization catalysts known in the art may be incorporated in addition to the catalytically active polyether-polyol component of the present invention.

Any conventional technique may be employed for foaming and curing the foaming composition of the present invention. For example, polyisocyanate component may be mixed with other components by a one-shot method or prepolymer method. The resulting compositions may be foamed by slab foaming, injection foaming (conventional or froth method), spray foaming, continuous laminating foaming and the like.

The present invention may be applied to a variety of polyether-polyols since the metals are chemically bound to said component. This enables one to produce a variety of polyisocyanurate foamed products having different properties as required.

To further illustrate the invention, the following examples are presented. Unless otherwise indicated, all parts and percentages are by weight.

EXAMPLE 1

A. PREPARATION OF MODIFIED POLYETHER-POLYOL

1. Crude polyether-polyol:

An autoclave previously purged with nitrogen gas was charged with 182 parts of sorbitol and 5.9 parts of 85% potassium hydroxide. The mixture was heated to 130° C. at 5 mmHg and reacted with 1500 parts of propylene oxide at 100°-110° C. for about 5 hours. After adding 43.6 parts of 85% potassium hydroxide, the reaction mixture was heated at 130° C. at 5 mmHg for 2 hours. The resultant crude polyether-polyol was a pale yellow, viscous liquid having a viscosity of 24,000 cps at 25° C. 94.1% of the total amount of potassium hydroxide added was converted to alcoholate.

2. Dibasic carboxylic acid adduct:

(a) Succinic acid adduct:

A four-necked flask (500 ml. capacity) provided with a stirrer, a thermometer and a nitrogen gas-introducing tube was charged with 300 g of crude polyether-polyol produced in the above step 1 and 12.5 g of succinic anhydride. The mixture was stirred at 80°-90° C. for 1 hour under nitrogen gas current. The resultant adduct was a pale yellow oil having a viscosity of 7,000 cps at 25° C.

(b) Glutaric acid adduct:

The procedure of the above step (a) was repeated except that 12.3 g of glutaric anhydride was substituted for succinic anhydride. The resultant adduct had a viscosity of 8,700 cps at 25° C.

(c) Maleic acid adduct:

The procedure of the above step (a) was repeated except that 12.3 g of maleic anhydride was substituted for succinic anhydride. The resulting adduct had a viscosity of 18,000 cps at 25° C.

(d) Phthalic acid adduct:

The procedure of the above step (a) was repeated except that 18.5 g of phthalic anhydride was substituted for succinic anhydride. The resulting adduct had a viscosity of 11,600 cps at 25° C.

(e) Cyclohexanedicarboxylic acid adduct:

The procedure of the above step (a) was repeated except that 19.4 g of cyclohexanedicarboxylic anhydride was substituted for succinic anhydride. The resulting adduct had a viscosity of 8,700 cps at 25° C.

B. TRIMERIZATION OF POLYISOCYANATE 150 g of crude 4,4'-diphenylmethanediisocyanate (MILLIONATE MR-100, Nippon Polyurethane Co., Ltd.) and 15 g of one of the modified polyether-polyol produced by the above-described steps (a) to (e) were taken into a 200 ml capacity paper cup. The temperature of both components were preliminarily adjusted to 25° C. The mixture was immediately stirred with a glass rod for 1 minute and allowed to cure by an exothermic reaction. The length of time required for the completion of the curing reaction (including stirring time) was determined. The results are shown in Table 1.

TABLE 1

| Modified polyether-polyol | Curing time |
| --- | --- |
| a | 2 min. 15 sec. |
| b | 1 min. 55 sec. |
| c | 9 min. 15 sec. |
| d | 27-30 sec. |
| e | 3 min. 25 sec. |

The IR spectra of cured products showed the characteristic absorbance of an isocyanurate ring.

EXAMPLE 2

100 g of each one of the products obtained in the steps (a) to (e) of Example 1, 2 g of silicone oil (DKS silicone D-332, Dai-Ichi Kogyo Seiyaku Co., Ltd.) and 55 g of trichlorofluoromethane (DAIFLON R-11U Daikin Kogyo Co., Ltd.) were taken into a polyethylene beaker (1 liter capacity), and the mixture was kept at 20° C. Then 215 g of crude 4,4'-diphenylmethanediisocyanate (MILLIONATE MR-100, Nippon Polyurethane Co., Ltd.), which was also kept at 20° C., was added thereto. The mixture was vigorously stirred by a labomixer for 5 seconds and poured into a mold having polyethylene lining. The mixture rapidly gave cured, foamed product having properties as shown in Table 2.

TABLE 2

| Modified polyether-polyol obtained in Example 1 | a | b | c | d | e |
| --- | --- | --- | --- | --- | --- |
| cream time, sec. | 12 | 10 | 18 | 26 | 16 |
| Gel time, sec. | 29 | 18 | 35 | 72 | 36 |

TABLE 2-continued

| Modified polyether-polyol obtained in Example 1 | a | b | c | d | e |
|---|---|---|---|---|---|
| Rise time, sec. | 39 | 22 | 49 | 140 | 44 |
| Density, g/cm$^3$ | 0.0328 | 0.0340 | 0.0317 | 0.0327 | 0.0327 |
| Percent of independ cells[*1] | 90.1 | 92.5 | 89.1 | 88.9 | 91.6 |
| 10% Compression modulus, kg/cm$^2$: | | | | | |
| longitudinal | 1.34 | 1.48 | 1.08 | 1.22 | 1.39 |
| lateral | 0.80 | 0.98 | 0.61 | 0.79 | 0.85 |
| Friability[*2]($\Delta$W), % | 60.8 | 55.0 | 59.3 | 89.0 | 63.1 |
| Oxygen index,[*3] O$_2$ % | 24.1 | 24.1 | 24.1 | 24.6 | 24.1 |

[*1] = ASTM D 2856-70
[*2] = ASTM C 421
[*3] = JIS K 7201-1972

EXAMPLE 3

An autoclave previously purged with nitrogen gas was charged with 92 parts of synthetic glycerine and 4.95 parts of 85% potassium hydroxide. The mixture was heated to 130° C. at 5 mmHg and reacted with 750 parts of ethylene oxide at 100°-110° C. for about 2 hours. The resulting crude polyether-polyol was reacted with 7.5 parts of succinic anhydride at 80°-90° C. for 1 hour to give a transparent viscous liquid.

EXAMPLE 4

Following the procedure as described in Example 3, 92 parts of glycerine were reacted with 3.3 parts of 85% potassium hydroxide. The reaction mixture was successively reacted with 234.5 parts of propylene oxide and 234.5 parts ethylene oxide at 100°-110° C. for about 3 hours. The resulting crude polyether-polyol was then reacted with 5.0 parts of succinic anhydride at 80°-90° C. for 1 hour to give a transparent, viscous liquid.

EXAMPLES 5 TO 7

Following the procedure as described in Example 2, similar foamed products were produced from the modified polyether-polyol of Examples 3, 4, and a commercially available polyether-polyol (DK POLYOL SO-400, OH value 400, DaiIchi Kogyo Seiyaku Co., Ltd.). The recipes and properties of the resulting foamed products are shown in Table 3.

TABLE 3

| | Example 5 | Example 6 | Example 7 |
|---|---|---|---|
| Modified polyether-polyol of Ex. 3 | 60 | — | 30 |
| Modified polyether-polyol of Ex. 4 | — | 60 | — |
| DK POLYOL SO-400 | — | — | 30 |
| Silicone oil[*1] | 1 | 1 | 1 |
| Amine catalyst[*2] | — | — | 1 |
| Trichlorfluoromethane[*3] | 60 | 60 | 60 |
| Crude MDI[*4] | 240 | 240 | 240 |
| Cream time, sec. | 12 | 23 | 21 |
| Gel time, sec. | 24 | 73 | 67 |
| Rise time, sec. | 27 | 87 | 79 |
| Density, g/cm$^3$ | 0.0303 | 0.0294 | 0.0304 |
| Percent of closed cells | 90.5 | 91.2 | 92.0 |
| 10% Compression modulus, kg/cm$^2$: | | | |
| vertical | 1.81 | 1.76 | 1.93 |
| horizontal | 0.89 | 0.81 | 0.83 |
| Friability ($\Delta$W), % | 22.0 | 56.5 | 61.3 |
| Oxygen index, O$_2$ % | 25.4 | 25.0 | 25.0 |

[*1] = DKS SILICONE D-332
[*2] = 33% solution of triethylenediamine in dipropylene glycol
[*3] = DAIFLON R-11U
[*4] = MILLIONATE MR-100

EXAMPLE 8

Example 6 was repeated except that the amount of trichlorofluoromethane was increased to 65 g. The foaming composition was poured into an aluminum mold of 40 cm×30 cm×5 cm inner size which was previously kept at 45° C. The composition was then allowed to foam and cure at room temperature for 10 minutes. The resultant foam had the following properties.

| Density, g/cm$^2$ | 0.042 |
|---|---|
| Oxygen index, O$_2$ % | 26.3 |
| Chimney test,[*1] % weight retained | 91.2 |
| Burn-through test, [*2] min. | 18 |

[*1] ASTM D 3014-74
[*2] U.S. Bureau of Mines No. 6366(1964)

The foam showed no adverse change upon heating at 130° C. for 72 hours.

EXAMPLE 9

The formulations according to Examples 2, 5 to 7 prior to mixing with polyisocyanate component were stored at room temperature or in a refrigerator for 7 days. The formulations remained transparent and homogeneous and were stable upon storage. The above has been offered for illustrative purposes only, and it is not for the purpose of limiting the scope of this invention, which is defined in the claims below.

We claim:

1. In a method for producing polyisocyanurate foam comprising reacting a polysiocyanate component with a polyether-polyol component in the presence of a foaming agent and a catalyst for trimerizing said polyisocyanate, the improvement comrising employing the anhydrous reaction product between a dibasic carboxylic acid anhydride and a partially alcoholated polyether-polyol with an alkali metal hydroxide and/or an alkaline earth metal hydroxide as the polyether-polyol component, whereby said component simultaneously acts as a trimerization catalyst.

2. The method according to claim 1, wherein said dibasic acid is selected from the group consisting of succinic, glutaric, fumaric, maleic, phthalic and cyclohexanedicarboxylic acids.

3. The method according to claim 1, wherein said metal is selected from the group consisting of sodium, potassium, calcium and magnesium.

4. The method according to claim 1, wherein said partially alcoholated polyether-polyol comprises 0.05 to 10 parts by weight of said metal per 100 parts by weight thereof.

5. The method according to claim 1, wherein said reaction product comprises 0.5 to 1.5 equivalents of said dibasic acid anhydride per one equivalent of said metal.

6. The method according to claim 1, wherein the equivalent ratio of said polyisocyanate to said polyether-polyol is greater than 2.

7. The method according to claim 1, wherein said polyether-polyol is prepared by reacting an initiator compound having at least two active hydrogen atoms with an alkylene oxide in the presence of an alkali metal hydroxide and/or an alkaline earth metal hydroxide.

8. The method according to claim 7, wherein said initiator compound is selected from the group consisting of low molecular weight aliphatic polyhydric alcohols, alkanolamines, aliphatic polyamines, aromatic polyamines and aromatic polyhydric alcohols.

9. The method according to claim 7, wherein said alkylene oxide is selected from the group consisting of ethylene oxide, propylene oxide, butylene oxide, and mixtures thereof.

10. The method according to claim 7, wherein said polyether-polyol initially has a hydroxyl number from 25 to 1000.

* * * * *